(12) United States Patent
Cattaneo

(10) Patent No.: US 10,597,181 B2
(45) Date of Patent: Mar. 24, 2020

(54) BOTTLE WRAPPING APPARATUS EMPLOYING THIN FILM OF STRETCHING PLASTIC MATERIAL

(71) Applicant: AREA S.R.L., Rho, (Milan) (IT)

(72) Inventor: Alessandro Cattaneo, Rho (IT)

(73) Assignee: Krones AG, Neutraubling (DE)

( * ) Notice: Subject to any disclaimer, the term of this patent is extended or adjusted under 35 U.S.C. 154(b) by 840 days.

(21) Appl. No.: 15/023,439

(22) PCT Filed: Sep. 18, 2014

(86) PCT No.: PCT/IB2014/064630
§ 371 (c)(1),
(2) Date: Mar. 21, 2016

(87) PCT Pub. No.: WO2015/040565
PCT Pub. Date: Mar. 26, 2015

(65) Prior Publication Data
US 2016/0207651 A1    Jul. 21, 2016

(30) Foreign Application Priority Data

Sep. 20, 2013   (IT) .............................. MI2013A1550

(51) Int. Cl.
*B65B 21/24*    (2006.01)
*B65B 11/00*    (2006.01)
(Continued)

(52) U.S. Cl.
CPC .......... *B65B 21/245* (2013.01); *B65B 11/008* (2013.01); *B65B 11/58* (2013.01);
(Continued)

(58) Field of Classification Search
CPC ..... B65B 21/245; B65B 11/008; B65B 11/58; B65B 21/06; B65B 35/30; B65B 35/40;
(Continued)

(56) References Cited

U.S. PATENT DOCUMENTS 3,404,505 A * 10/1968 Hohl ..................... B65B 17/025
206/150
4,050,220 A    9/1977 Lancaster et al.
(Continued)

FOREIGN PATENT DOCUMENTS

DE           38 39 498 A1   5/1990
DE   10 2012 007 778 A1   8/2013
(Continued)

OTHER PUBLICATIONS

International Search Report, dated May 6, 2015, from corresponding PCT Application.
(Continued)

*Primary Examiner* — Gloria R Weeks
*Assistant Examiner* — Dariush Seif
(74) *Attorney, Agent, or Firm* — Young & Thompson

(57) ABSTRACT

A method for the wrapping of containers, particularly bottles, into bundles including rows of adjacent containers, wherein the containers are fed continuously, according to a displacement axis, to a wrapping station (2, 3) and wound with a spiral of a stretching plastic film defining a continuous wrapping. The containers (B) are pushed into a portion upstream of the wrapping station (2, 3) by a conveying unit (1) provided with at least guiding and supporting elements of the containers and with a pacing unit (1*a*), the containers (B) wrapped with the stretching plastic film being withdrawn, downstream of each winding unit (2, 3), with the help of a dragging device (T1, T2, T3), the guiding and supporting elements including members (11, 12, 13) elongated in the longitudinal direction of the displacement axis which extend also into the wrapping station (2, 3).

1 Claim, 16 Drawing Sheets

(51) Int. Cl.
  *B65B 35/40* (2006.01)
  *B65B 61/10* (2006.01)
  *B65B 35/44* (2006.01)
  *B65B 35/30* (2006.01)
  *B65B 21/06* (2006.01)
  *B65B 11/58* (2006.01)
  *B65B 61/06* (2006.01)
  *B65G 47/08* (2006.01)

(52) U.S. Cl.
  CPC ............. *B65B 21/06* (2013.01); *B65B 35/30* (2013.01); *B65B 35/40* (2013.01); *B65B 35/44* (2013.01); *B65B 61/06* (2013.01); *B65B 61/10* (2013.01); *B65G 47/088* (2013.01)

(58) Field of Classification Search
  CPC ......... B65B 35/44; B65B 61/06; B65B 61/10; B65B 27/04; B65G 47/088
  USPC ..... 53/399, 441, 449, 588, 556, 48.7; 83/16, 83/171; 198/624
  See application file for complete search history.

(56) References Cited

U.S. PATENT DOCUMENTS

| | | | | |
|---|---|---|---|---|
| 4,083,163 A * | 4/1978 | Ganz | ................ | B65B 21/245 53/210 |
| 4,633,647 A * | 1/1987 | Ganz | ................ | B65B 21/245 53/233 |
| 4,655,028 A * | 4/1987 | Silbernagel | .......... | B65B 11/008 53/133.6 |
| 4,689,934 A * | 9/1987 | Ganz | ................ | B65B 21/245 53/233 |
| 4,712,354 A * | 12/1987 | Lancaster | ............ | B65B 11/008 53/176 |
| 4,730,436 A * | 3/1988 | Angelino | ............... | B65B 11/58 53/170 |
| 4,738,079 A * | 4/1988 | Lancaster | ............... | B26D 5/20 53/389.3 |
| 4,872,302 A * | 10/1989 | van Eijsden | ............ | B65B 53/00 53/441 |
| 4,881,357 A * | 11/1989 | Ballestrazzi | ............. | B65B 9/02 53/64 |
| 4,930,292 A * | 6/1990 | Focke | ................... | B65B 11/008 53/263 |
| 5,140,800 A * | 8/1992 | Martin | ................... | B26D 5/38 493/33 |
| 5,182,894 A * | 2/1993 | Bate | .................... | B65B 11/008 53/170 |
| 5,531,061 A * | 7/1996 | Peterson | .............. | A01F 15/071 53/133.8 |
| 5,638,665 A * | 6/1997 | Muller | ................... | B65B 21/06 198/419.3 |
| 5,979,147 A * | 11/1999 | Reuteler | .............. | B65G 47/088 198/419.2 |
| 6,751,931 B2 * | 6/2004 | Cere' | ................... | B65B 21/245 53/397 |
| 7,536,844 B2 * | 5/2009 | Aubin | .................. | B65B 11/008 53/399 |
| 7,610,737 B2 * | 11/2009 | Kovacs | .................. | B65B 9/067 53/374.6 |
| 9,221,613 B2 | 12/2015 | Koppers et al. | | |
| 9,315,338 B2 * | 4/2016 | Peterman | ............. | B65G 47/088 |
| 2009/0049798 A1 * | 2/2009 | Lorsch | .................... | B65B 55/20 53/79 |
| 2012/0031050 A1 | 2/2012 | Werner et al. | | |
| 2012/0102888 A1 * | 5/2012 | Downhill | .............. | B65B 11/008 53/461 |
| 2012/0151879 A1 * | 6/2012 | Ghezzi | ................. | B65B 11/025 53/448 |
| 2013/0014476 A1 * | 1/2013 | Stork | .................... | B65B 21/245 53/552 |
| 2014/0318712 A1 * | 10/2014 | Stuhlmann | .............. | B65B 17/02 156/556 |
| 2015/0191263 A1 * | 7/2015 | Nitsch | ..................... | B65B 17/02 156/556 |
| 2019/0016488 A1 * | 1/2019 | Peccetti | .................. | B65B 11/58 |
| 2019/0023430 A1 * | 1/2019 | Peccetti | ................ | B65B 11/008 |

FOREIGN PATENT DOCUMENTS

| | | | |
|---|---|---|---|
| EP | 0 152 959 A2 | 8/1985 | |
| EP | 0152959 A2 * | 8/1985 | .......... B65B 11/008 |
| EP | 0 197 574 A1 | 10/1986 | |
| EP | 0 708 028 A1 | 4/1996 | |
| EP | 1 431 185 A1 | 6/2004 | |
| EP | 1 495 973 A1 | 1/2005 | |
| EP | 2 202 186 A1 | 6/2010 | |
| EP | 2 415 695 A1 | 2/2012 | |
| GB | 2 076 772 A | 12/1981 | |
| IT | MI2011A001543 | 2/2013 | |
| IT | MI2013A001550 | 9/2013 | |
| WO | 90/09316 | 8/1990 | |
| WO | 99/14122 A1 | 3/1999 | |
| WO | 2012/055490 A1 | 5/2012 | |
| WO | WO-2017167357 A1 * | 10/2017 | ............ B65B 11/58 |

OTHER PUBLICATIONS

European Search Report issued in Application No. 17207675.4, dated Apr. 19, 2018.

* cited by examiner

BOTTLE WRAPPING APPARATUS EMPLOYING THIN FILM OF STRETCHING PLASTIC MATERIAL

FIELD OF THE INVENTION

The present invention relates to a continuous bundling apparatus, that is, a machine capable of accomplishing a unitary and compact wrapping (the so-called bundle) of a bottle array, by means of a thin film of plastic material; in particular, the invention relates to a bundling apparatus which employs stretching plastic film.

BACKGROUND ART

In the field of bundle bottle wrapping, the use of plastic film is widely known.

A traditional and widespread method provides the use of heat-shrinking plastic film. In particular, a film of heat-shrinking plastic material is wound around an array of four/six bottles, arranged side by side to form an assembly of two/three bottles on two rows, which is then subjected to an oven to cause the shrinking of the film and thus form a compact and stable bundle.

The stability of this bundle is a fundamental feature, if one takes into account the—often rough and careless—handling which it undergoes during the transfer from the manufacturing site to the purchasing sites of shopping centres and from these to the purchasers' homes.

A widely acknowledged drawback of this solution is given by the fact that the cost of this type of wrapping is relatively high. In fact, in order to obtain the desired resistance and stability features, a heat-shrinking plastic material with a thickness of 30-40 μm, of a weight of 5 to 8 gr/sqm, and hence already due to this rather expensive, is employed; in addition to that, the use of a heat-shrinking oven in turn implies non-negligible installation and energy consumption costs.

WO99/14122 discloses a bundling machine wherein, regardless of the film used, no continuous functioning is obtained, but it is provided to first divide the bottles into single assemblies of a predetermined number of pieces, to subsequently wrap with film the single assembly. EP 708 028 discloses a similar solution. The number of bottles of the bundle in this case is predetermined and, to be able to change it, it is necessary to act replacing a series of mechanic members, in particular the templates which define the bottle position.

EP2202186 also discloses a bundling machine which acts discontinuously, winding with plastic film the individual bottle assemblies, after having separated them from the mass of fed bottles.

In order to offer an alternative solution, bundle wrapping apparatuses have already been proposed—at least at a theoretic level—which resort to stretching plastic film. For example, EP 197 574 discloses a different solution for package wrapping—which may also be bottle packages—with stretching film, that is, film which does not need to undergo heat-shrinking.

This solution consists in causing a sequence of bottle assemblies to advance continuously, along a feeding line, and to cause them to be wound around by a stretching film laid as a continuous spiral, subsequently providing to severe the packages one from the other through a severing device.

However, in the introductory part of this patent it is detailed that such a continuous spiral winding has the drawback that, by effect of the oblique winding of the film, the members contained in each assembly—especially if they are cylindrical-surface bottles—undergo a twisting effect, which tends to warp the final package and hence to decompose the alignment between the bottles, with the effect of a possible package opening.

For this reason, the object of the invention disclosed in EP 1 431 185 is a machine capable of sequentially performing two windings, one above the other: the former as a continuous spiral and the subsequent one—after the cutting and the severing of the package—on the package itself rotated by 90° with respect to the others.

EP 197 574 discloses another similar machine, wherein the winding of the plastic film is accomplished through two reels inclined in an opposite way with respect to the transport line.

Also WO2012/055490 discloses a winding apparatus with plastic film, where two film coils are used. However, no specific arrangement is provided for effectively obtaining a final bundle, neither in connection with the entering step of bottles, nor in the step of the removal and severing of the individual bundle.

As can be clearly understood, although at a theoretic level these machines have merits over heat-shrinking film apparatuses, at a practical level various drawbacks exist.

The main one derives from the fact that the stretching film, as known, is suitably stretched before the application, undergoing great elongation, up to the order of 300%; from this stretching a corresponding elastic shrinking force derives, which is the one which normally ensures the integrity of the package even in difficult transport and displacement conditions. As a result this force—which acts also immediately after the application of the first film—causes that, in particular, a package which has been severed from the reminder before the application of the second film undergoes a twisting force which may cause the warping thereof, even with release of the contents, that is, precisely that effect which one aimed to avoid.

On the other hand, reducing the film winding tension and the resulting stretching—to avoid the forming of excessive twisting forces—is not a viable solution, because a reduced stretching of the film would cause both an undue consumption of material, and a residual elongation of the material which would make bundle management unpleasant for the final user, and a lack of containment forces which are instead necessary for maintaining securely together the bundle containers. A remarkable improvement of this wrapping technique with stretching film has been reached with the process disclosed in Italian patent application no. MI2011A001543 in the name of the same Applicant. Here it is suggested to feed the bottles to the wrapping station in a continuous and compact manner, causing them to progress until beyond the wrapping station with a suitable guiding slide, forming then a single helical wrapping with stretching film, and separating said continuous wrapping into short segments, that is, into individual bundles, in a cutting station located downstream of the winding station.

Although the process described here has substantially effectively solved the problem of the prior art, it has been seen that margins for further improvement exist. In particular, it has been detected that, in order to manufacture a stable bundle, it is important to avoid any bottle misalignment as long as the bundle wrapping has been completed. This action can hardly be performed on the bottles being wrapped, because there is the risk of interference with the film winding members.

EP 1 495 973 discloses a dragging and indexing system of a mass of bottles, which acts through a pair of wheels, provided with peripheral recesses with which part of the container body engages. U.S. Pat. No. 5,979,147, DE 383 94 98 and EP 2 415 695 disclose similar apparatuses, wherein there are provided wheel means or moving bars provided with engaging members for sorting and indexing the bottles along the displacement path.

SUMMARY OF THE INVENTION

The problem at the bottom of the invention is therefore that of supplying a structure of bundling machine which overcomes the mentioned drawbacks.

In such respect, it has been noticed that, in order to obtain bottle bundles with a wrapping perfectly stable in time, with a desired stretching of the plastic film, it is essential that the bottles be caused to progress towards the wrapping station perfectly adjacent and stably aligned the ones to the others, hence with a calibrated thrust pressure between one and the next, without nevertheless exceeding in order not to impair bottle integrity or cause jamming in the movement.

This object is achieved through the features mentioned in the attached main claims. The dependent claims disclose preferential features of the present invention.

In particular, according to a first aspect of the invention, a process for the wrapping of containers is provided, particularly bottles, into bundles comprising rows of adjacent containers, wherein said containers are continuously fed to a wrapping station according to a displacement axis, wherein they are wound with a spiral of a stretching plastic film defining a continuous wrapping, wherein said containers are pushed along a path portion upstream of the wrapping station by a conveying unit provided with at least guiding and supporting means of said containers and with a pacing unit, and wherein downstream of each winding unit of said wrapping station, said containers wound with said stretching plastic film are withdrawn with the help of a dragging device, said guiding and supporting means comprising elongated members in the longitudinal direction of the displacement axis, which extend also within said wrapping station.

The containers are guided by said guiding and supporting means which comprise at least external guiding means, which remain resting on external surfaces of external rows of containers, and internal guiding means, which remain resting on internal surfaces of two opposite rows of containers.

According to a further aspect, downstream of said wrapping station the array of containers wrapped with said stretching film is divided into separate groups by a cutting unit, which acts crosswise to the displacement axis of the containers in correspondence of a position in which transversal rows of adjacent containers have been previously moved apart overcoming the elastic resistance of said stretching film by tension means.

Preferably, said wrapping station comprises two winding units wherein respective reels of stretching plastic film are caused to rotate in opposite directions for winding counter-rotating coils of plastic film on said rows of containers.

According to another aspect of the invention, a wrapping apparatus of containers is provided, particularly bottles, into bundles comprising rows of adjacent containers, comprising a wrapping station wherein a film of stretching plastic material is continuously wound spirally on adjacent rows of containers moving according to a displacement axis, said film being delivered by reels rotating around said displacement axis, wherein upstream of said wrapping station a conveying unit is provided, provided with at least guiding and supporting means of said containers and with a pacing unit and wherein downstream of each winding unit of said wrapping station, a dragging device is provided apt to impart a withdrawal force to said rows of containers wound with stretching plastic film, said guiding and supporting means comprising members elongated in the direction of said displacement axis, which extend also within said wrapping station.

According to a further aspect, downstream of said wrapping station a cutting and spacing apart unit is provided, provided at least with a bridge carriage, alternately movable according to a translation axis parallel to the displacement direction of said containers, whereon a cutting device is mounted movable crosswise to said translation axis.

Preferably, the progress movement of said bridge carriage is synchronised with the movement of said rows of containers based on a control determined by a counting sensor of said containers.

Advantageously it can furthermore be provided an elongation mechanism provided with a first pair of retaining members and a second pair of retaining members mounted on said bridge carriage, upstream and downstream of said cutting device, respectively, mutually movable apart and each apt to engage a line of said containers.

In the apparatus preferably said pacing unit comprises at least an intermediate dragging device acting on the outer surfaces of said rows of containers, simultaneously engaging a plurality of containers for each outer row. The intermediate dragging device consists of a pair of annular-loop conveyor belts, having a dragging surface running on a vertical plane, arranged on two opposite sides with respect to the main horizontal conveyor belt, said annular-loop conveyor belts being provided with equidistant vertical ribbings for engaging between two adjacent containers of said rows of containers.

According to another aspect, said intermediate dragging device is mounted above and upstream with respect to a second lower dragging device which consists of a pair of disc-shaped plates, arranged on two opposite sides with respect to the main horizontal conveyor belt, mounted rotating on respective vertical axes and making up supporting plane for the base of said containers, each of said plates carrying an upright central turret representing a centring and initial adjustment means of the position of said bottles.

According to another aspect of the invention, a wrapping apparatus of containers is provided, particularly bottles, into bundles comprising rows of adjacent containers, comprising a wrapping station wherein a film of stretching plastic material is continuously spirally wound on adjacent rows of containers moving according to a displacement axis, said film being delivered by reels rotating around said displacement axis, wherein downstream of said wrapping station a cutting and spacing-apart unit is provided, at least provided with a bridge carriage, alternately movable according to a translation axis parallel to the displacement direction of said containers, whereon a cutting device is mounted movable transversally to said translation axis and wherein an elongation mechanism is furthermore provided, provided with a first pair of retaining members and a second pair of retaining members mounted on said bridge carriage, upstream and downstream of said cutting device, respectively, mutually movable apart and each apt to engage a line of said containers for distancing them from each other and define a greater crossing space for said cutting device.

BRIEF DESCRIPTION OF THE DRAWINGS

Further features and advantages of the invention are in any case more evident from the following detailed description of a preferred embodiment, given purely as a nonlimiting example and illustrated in the attached drawings, wherein.

DETAILED DESCRIPTION OF PREFERRED EMBODIMENTS

Figure 1:
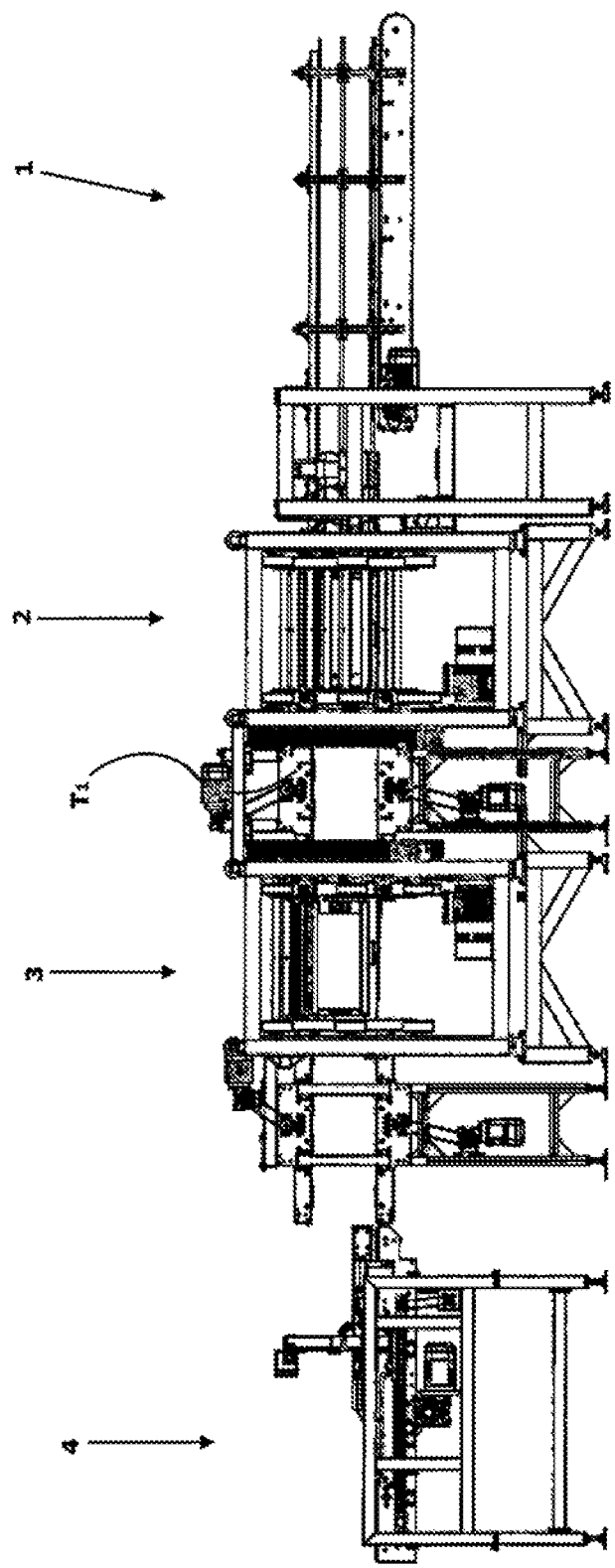
FIG. 1 is an elevation side view of the entire apparatus according to a preferred embodiment of the invention.
Figure 2:
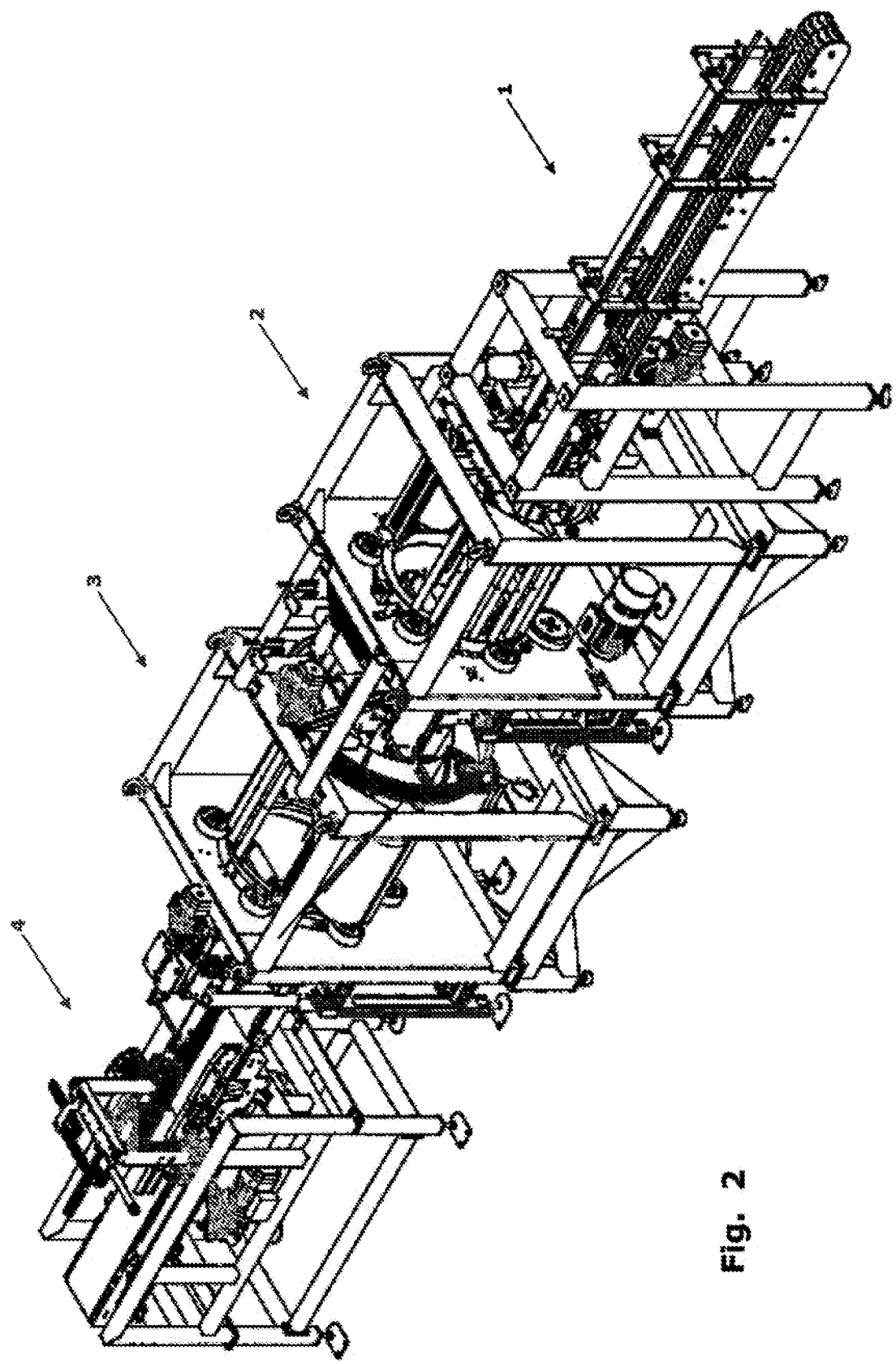
FIG. 2 is a perspective view of the apparatus of FIG. 1.
Figure 3:
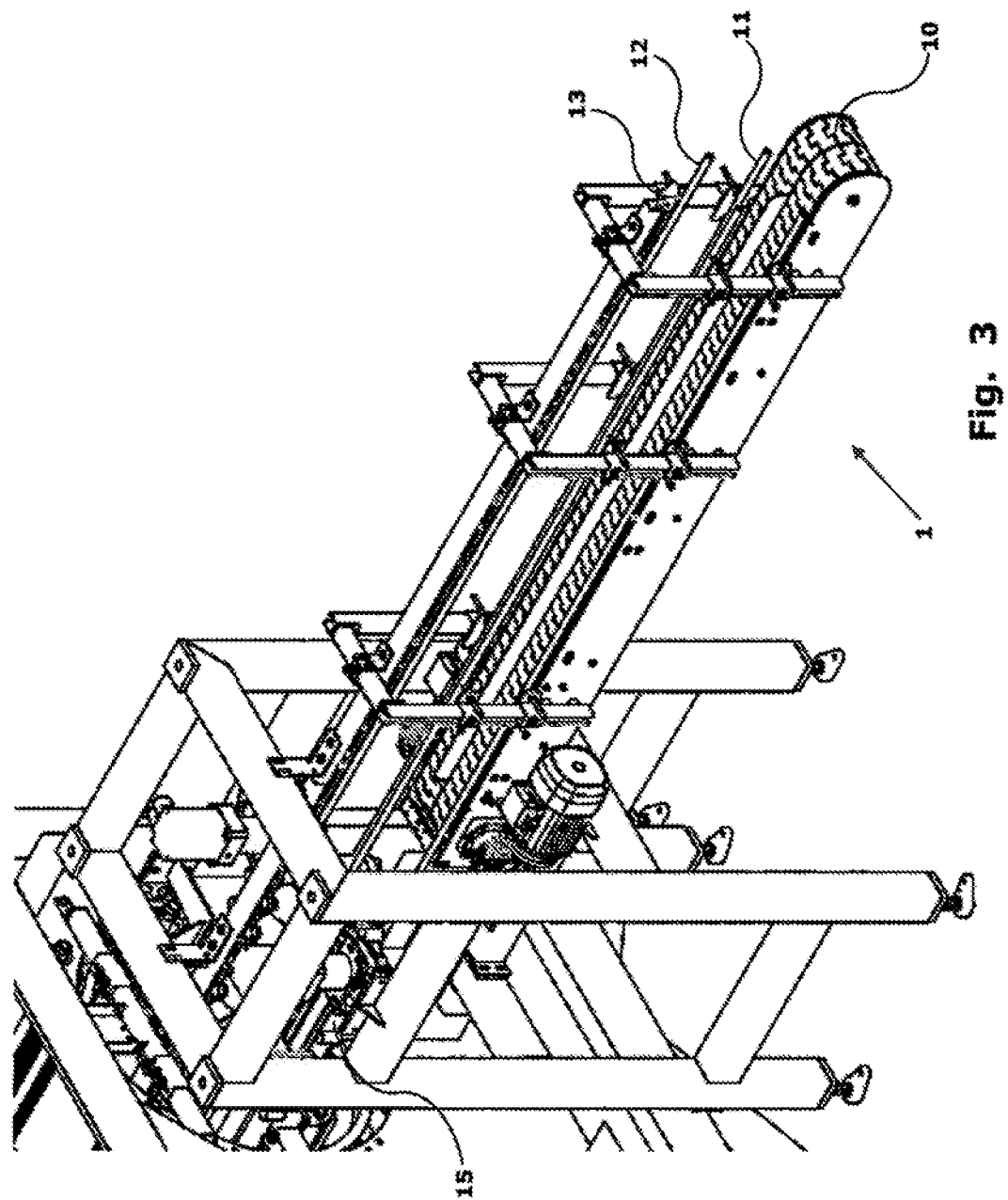
FIGS. 3 and 4 are enlarged views of parts of FIG. 2.
Figure 4:
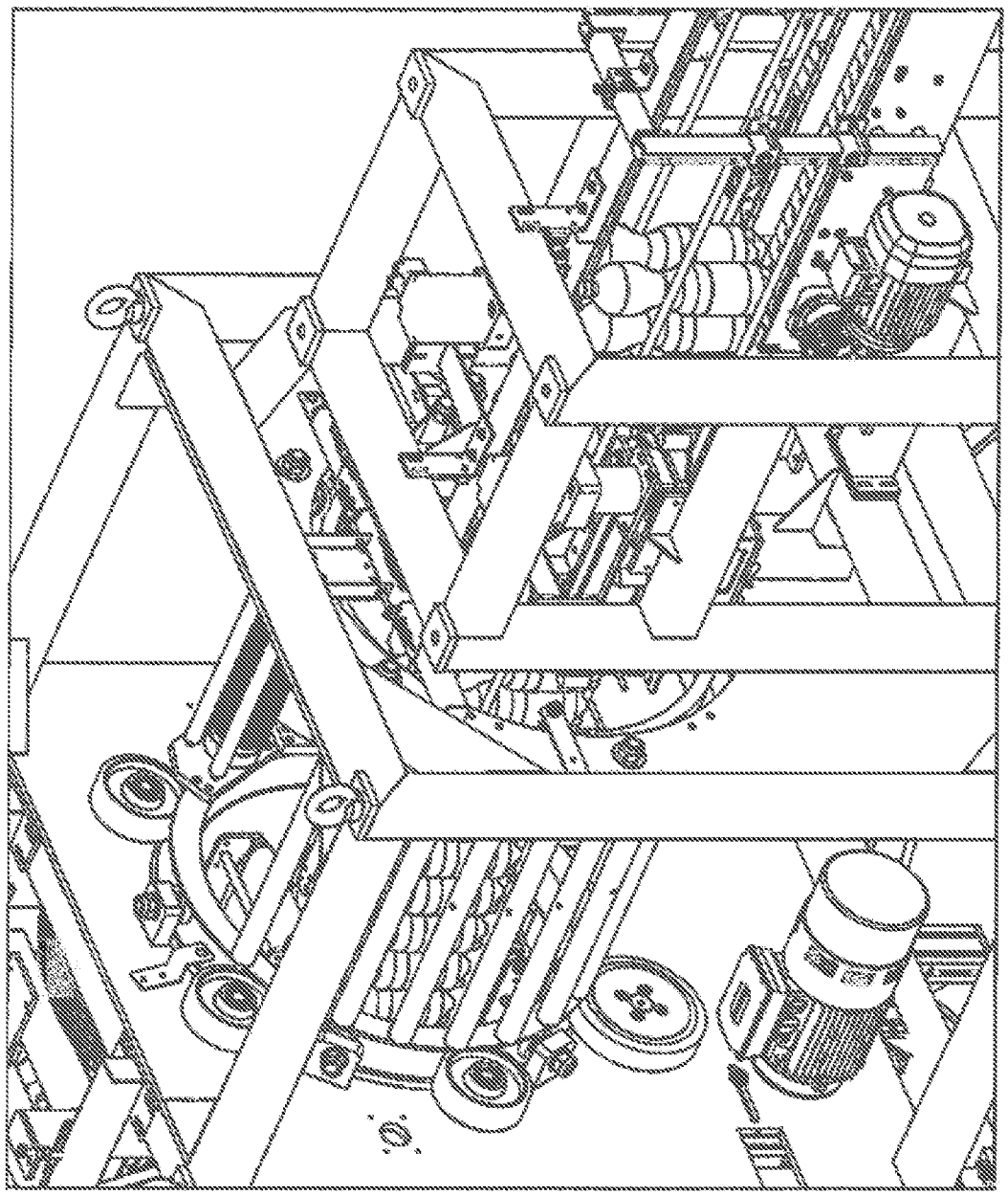
Figure 5:
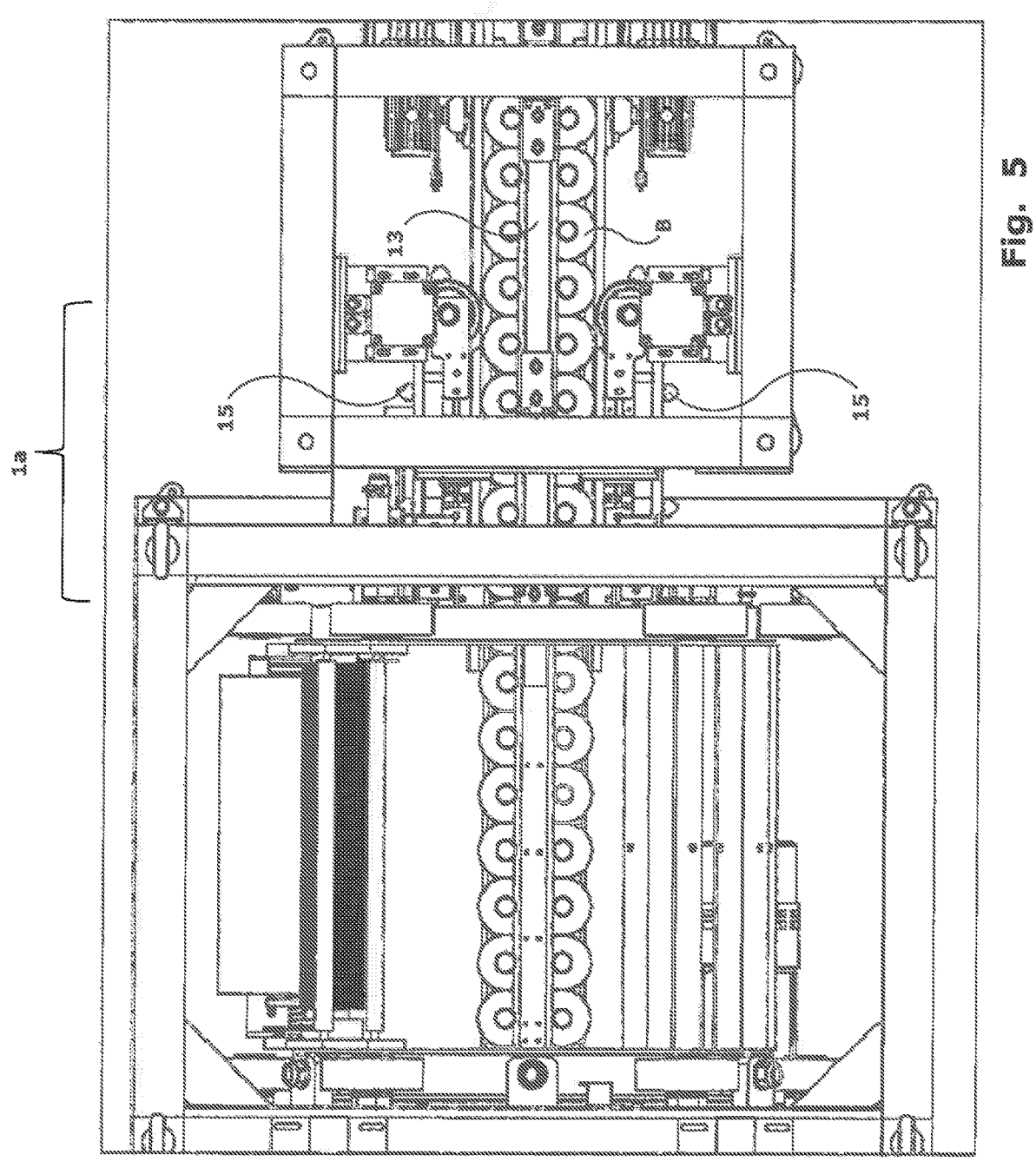
FIG. 5 is a top plan view of a winding unit and of the conveying station.

A bundling apparatus consists, in a way known per se, of a bottle feeding line, of a winding station and of a downstream severing device.

The winding or wrapping station, which makes up the unit in which the bottle wrapping is practically completed with the stretching film, may be of any known type, for example as disclosed in Italian application MI2011A001543 in the name of the same Applicant. Since this station does not form a specific object of the present invention, it will not described here in further detail.

During the use of a wrapping apparatus of this type it has been possible to ascertain that the problem at the bottom of the present invention, that is, that of obtaining tidy bottle bundles with a perfectly stable wrapping, may be solved only through a process in which the bottles are maintained aligned and compacted, from the area upstream of the winding station until the separation of the individual bundles, in the most constant way possible. In other words, it has been seen that it is not sufficient to adjust bottle progress simply by acting on the speed of the conveyor belts of the feeding line, since in this case the mutual pressure between the bottles is not suited to maintain a good alignment until the forming of the individual bundles.

As a result it is provided, according to the present invention, to arrange immediately upstream of said winding/wrapping station, a calibrated conveying station, comprising suitable means for bottle pacing control and adjustment.

More precisely, with reference to FIGS. 1-7, an improved conveying assembly 1 for bottles B is provided, arranged between a traditional conveyor belt upstream (not shown in FIG. 1) and a wrapping unit immediately downstream.

The wrapping station, in the embodiment shown, consists of two machines 2 and 3 for the winding of stretching film, arranged sequentially one after the other along the displacement axis of bottles B; the two winding machines are arranged for continuously winding a web of stretching film around the displacement axis of bottles B: the rotary motion of a reel of film around the axis of the displacement line, combined with the bottle progress motion, causes the laying of a plurality of helical coils of stretching film around the bottles. The reels of film on the two machines move with a rotary motion in opposite directions.

Bottles B typically progress on the displacement line in an array of two parallel rows, with the bottles on the two rows mutually aligned, so as to form specularly adjacent pairs. In other words, along the direction crosswise to the rows, lines of mutually aligned bottles form (typically two, but theoretically even more).

The transfer of the bottles within the winding unit occurs in a way known from the art, for example through a slide mounted cantilevered as disclosed in MI2011A001543.

According to the invention, improved conveying assembly 1 (better visible in FIGS. 2-3) consists of a conventional conveyor belt or moving carpet 10, arranged according to a horizontal plane, and of bottle guiding and supporting means, as well as of a pacing unit 1a.

In particular, the guiding and supporting means imply members elongated in the longitudinal direction of the displacement axis and extend into wrapping assembly 2, 3 with the function of accurately guiding the two rows of bottles and of supporting them in their condition of adjacent pairs, despite the development of twisting forces deriving from the laying of the stretching film in the shape of a spiral.

For such purpose, the bottle guiding and supporting means comprise at least external guiding means, which rest on external surfaces of the bottle rows, and internal guiding means, which rest on internal surfaces of the two bottle rows.

According to the preferred embodiment illustrated in FIGS. 1-7, the external guiding means are in the shape of two pairs of lateral rods 11 and 12 which constrain laterally, at two different heights, the two bottle rows B resting on belt 10. The two pairs of lateral rods 11 and 12 are preferably adjustable in a horizontal position, so as to be able to be arranged more or less close to the central displacement axis of conveying assembly 1.

Figure 6A:
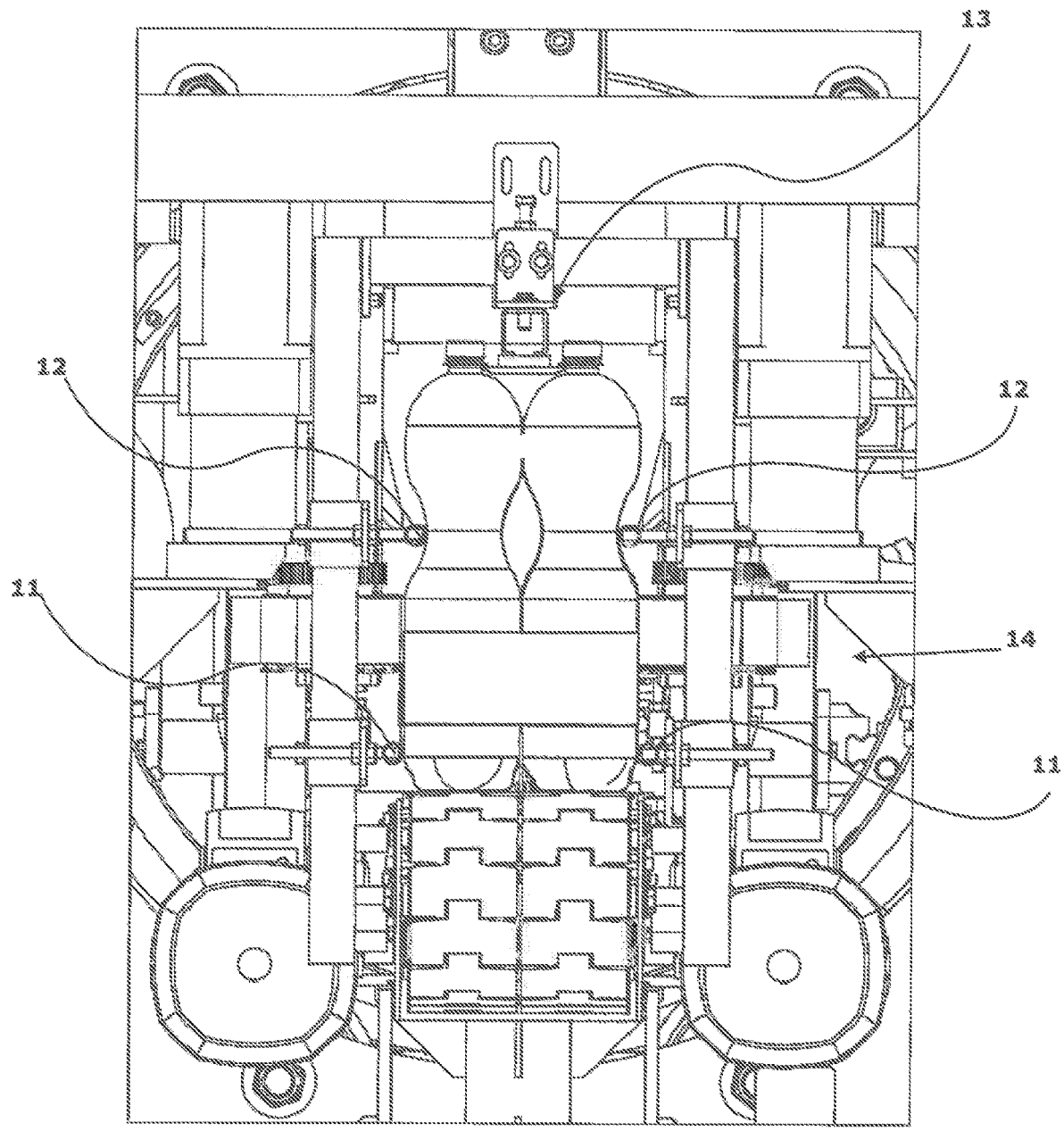
FIG. 6A is an elevation front view in correspondence of the conveying station.

Advantageously, the first pair of lateral rods 11 is mounted at a height little above the resting plane of belt 10, for example at 0.5-5 cm from belt 10, hence in the proximity of the base of the bottles (FIG. 6A). The second pair of lateral rods 12 is mounted in the proximity of the half height of the bottle, preferably above the average height. If bottles B have a wavy shape, with a surface recess (as illustrated in FIG. 6A), the second pair of lateral rods is arranged in correspondence of this bottle recess or bend, so as to be arranged inside the theoretical profile of the package wrapping.

The internal guiding means are instead in the shape of an upper rail 13, arranged at the height of the terminal neck of the bottles. In particular, rail 13 is supported over the conveying assembly 1 at a height just below the bottle caps (see FIG. 6A). Rail 13 acts as crosswise spacer between the corresponding pairs of the bottle necks of the two rows of bottles B, so as to avoid that the upper part of the bottles may move mutually closer under the tension applied by the stretching film of the wrapping. Also this upper rail 13 extends longitudinally according to the displacement axis of conveyor belt 10, up into the two units 2 and 3 of the winding assembly.

Preferably, rail 13 consists of a rod of low-friction plastic material or other material coated with low-friction material (for example, teflons).

In the terminal part of conveying assembly 1, just before the entry into the winding assembly, pacing unit 1a is provided, which acts in cooperation with the guiding and supporting means.

Pacing unit 1a has the function of causing bottles B to progress in a way adjusted with a preset pitch, pacing and compacting pressure between one bottle and the next, before said bottles arrive at the wrapping station.

Pacing unit 1a has at least an intermediate gripping and dragging device 14, which cooperates with the underlying conveyor belt 2 for completing the synchronised displacement of the bottles. The positioning of the intermediate gripping and dragging device 14 is clearly visible in FIG. 6A.

More precisely, this gripping and dragging device 14 essentially consists of a pair of conveyor belts 14' and 14" having their dragging surface running on a vertical plane, which drags said bottles acting by friction and modular coupling against the lateral surface thereof.

The two belts 14' and 14" have the same shape and a specularly symmetrical arrangement with respect to a vertical, central plane; therefore, only conveyor belt 14' is described in detail.

Figure 6B:
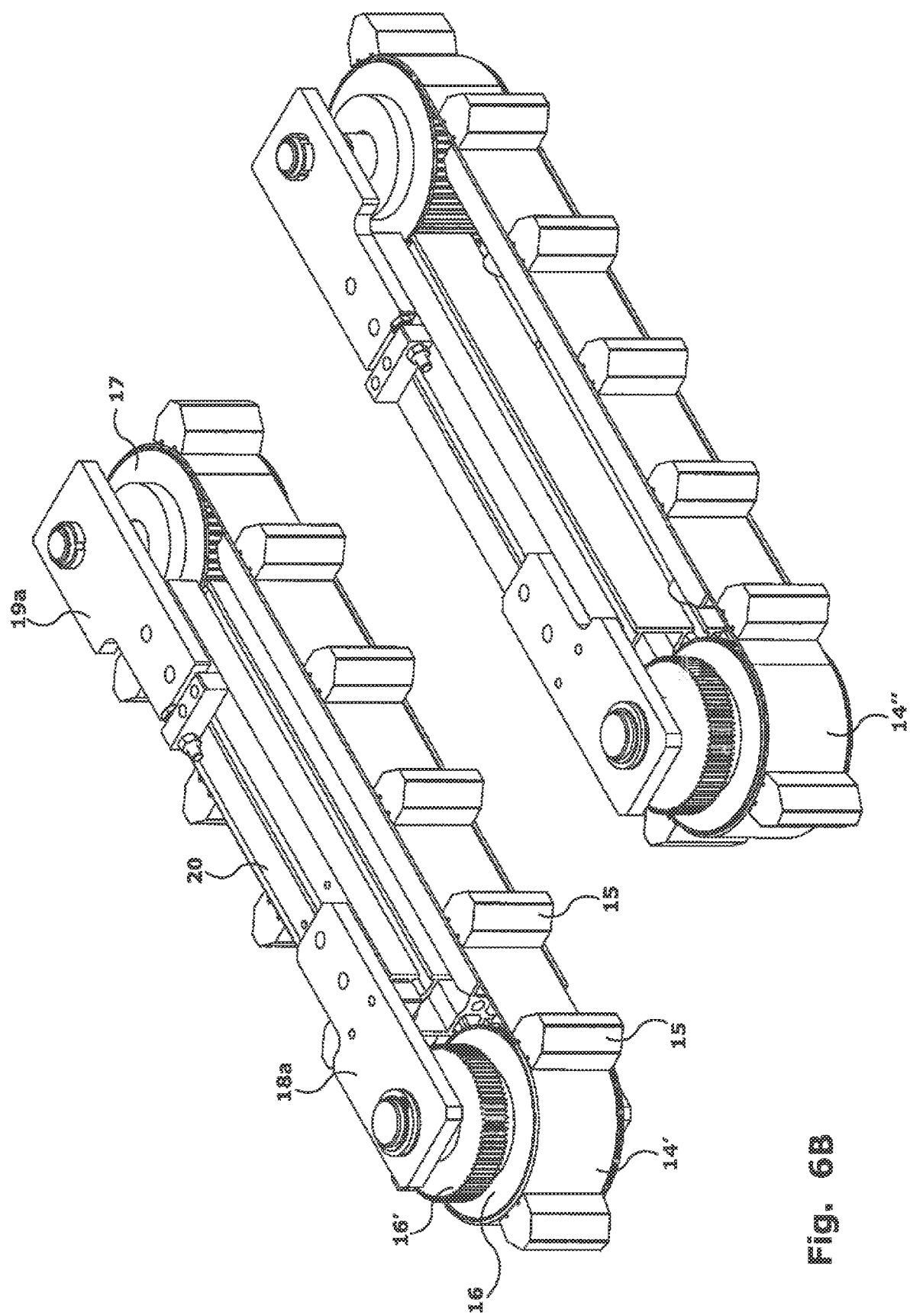
FIG. 6B is a perspective view of the intermediate dragging devices according to the invention
Figure 7:
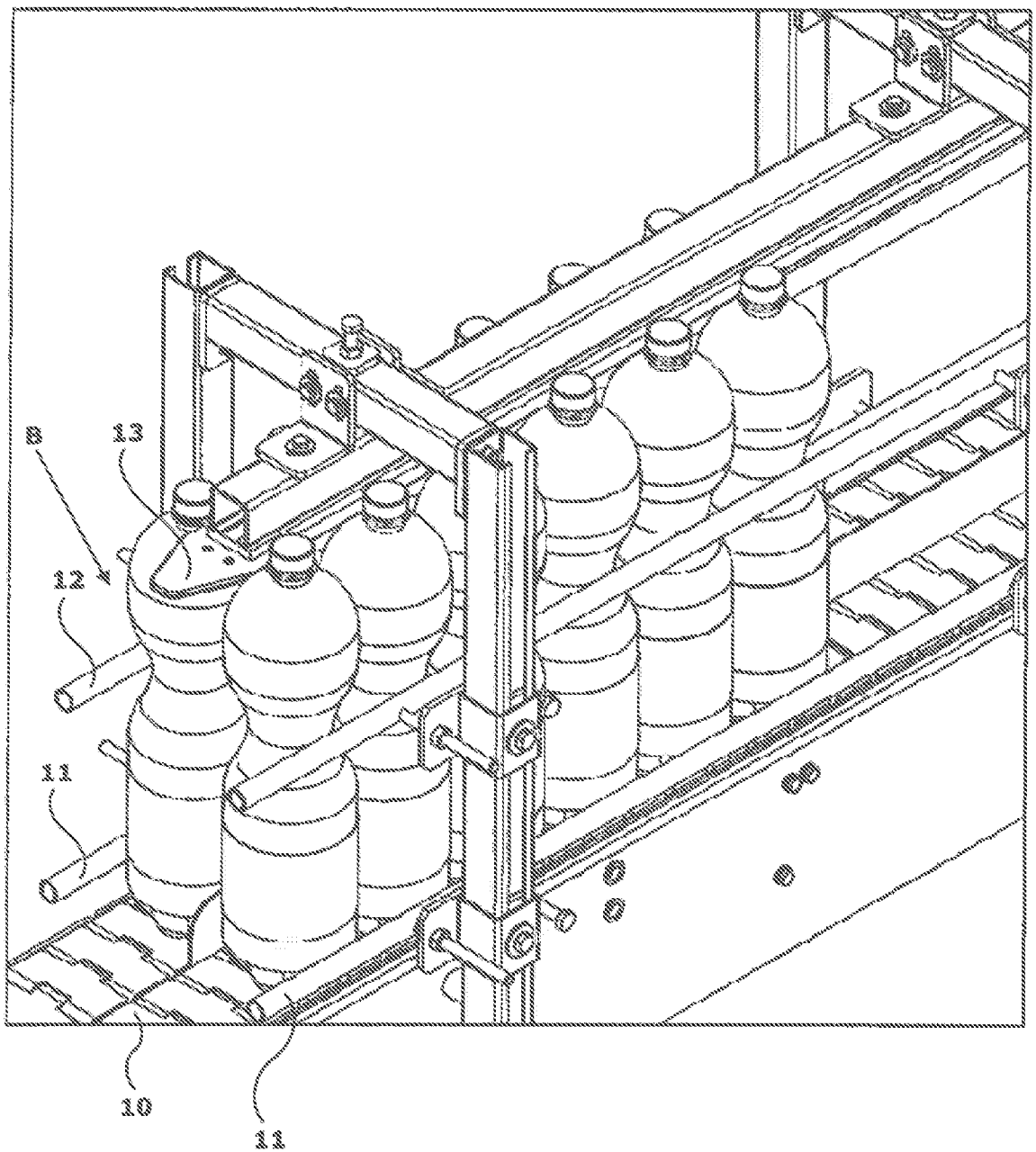
FIG. 7 is a perspective view of a terminal part of the guiding and supporting means according to a preferred embodiment of the invention.
Figure 8:
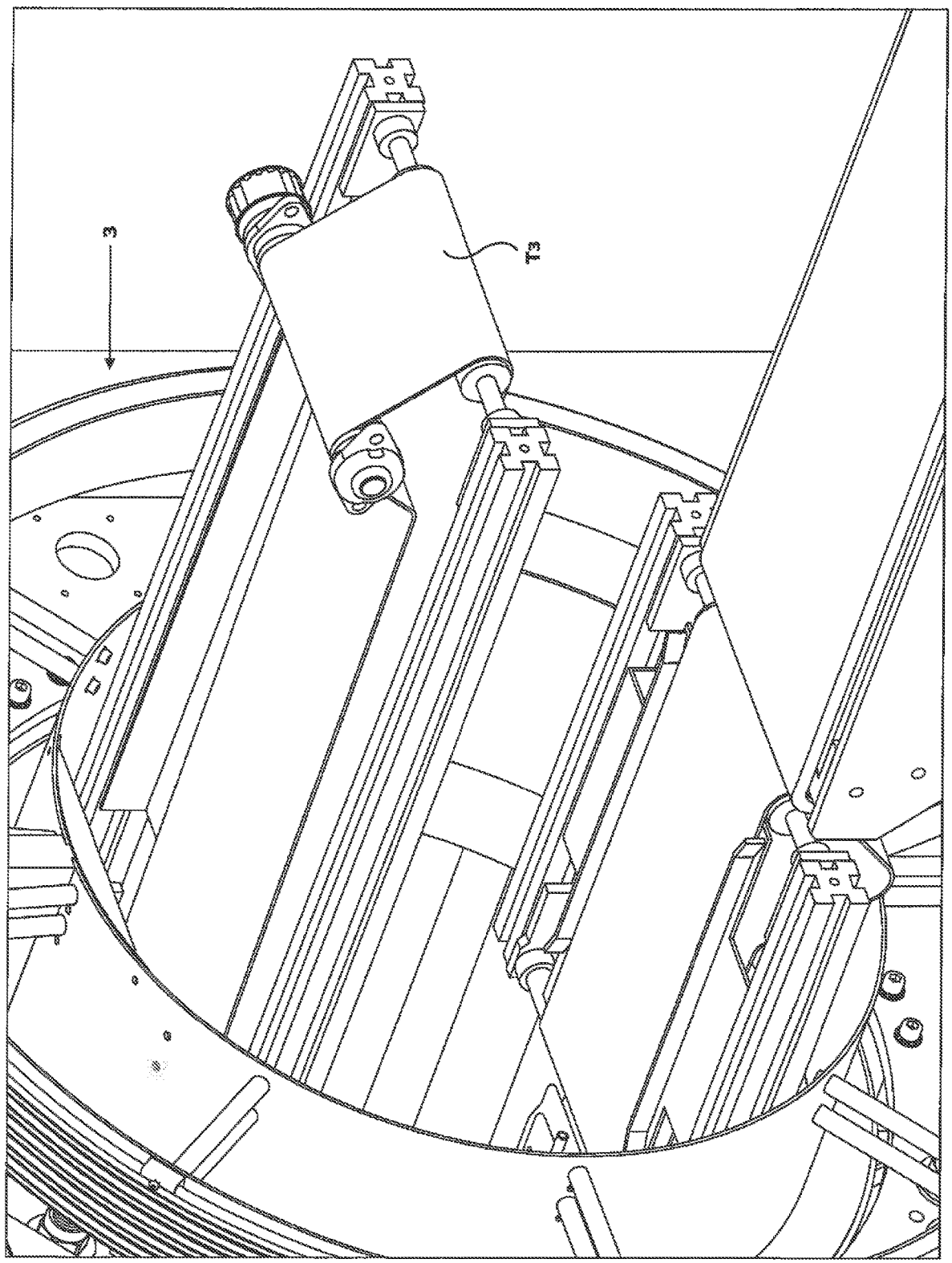
FIG. 8 is a perspective view of an embodiment of a dragging device.
Figure 9:
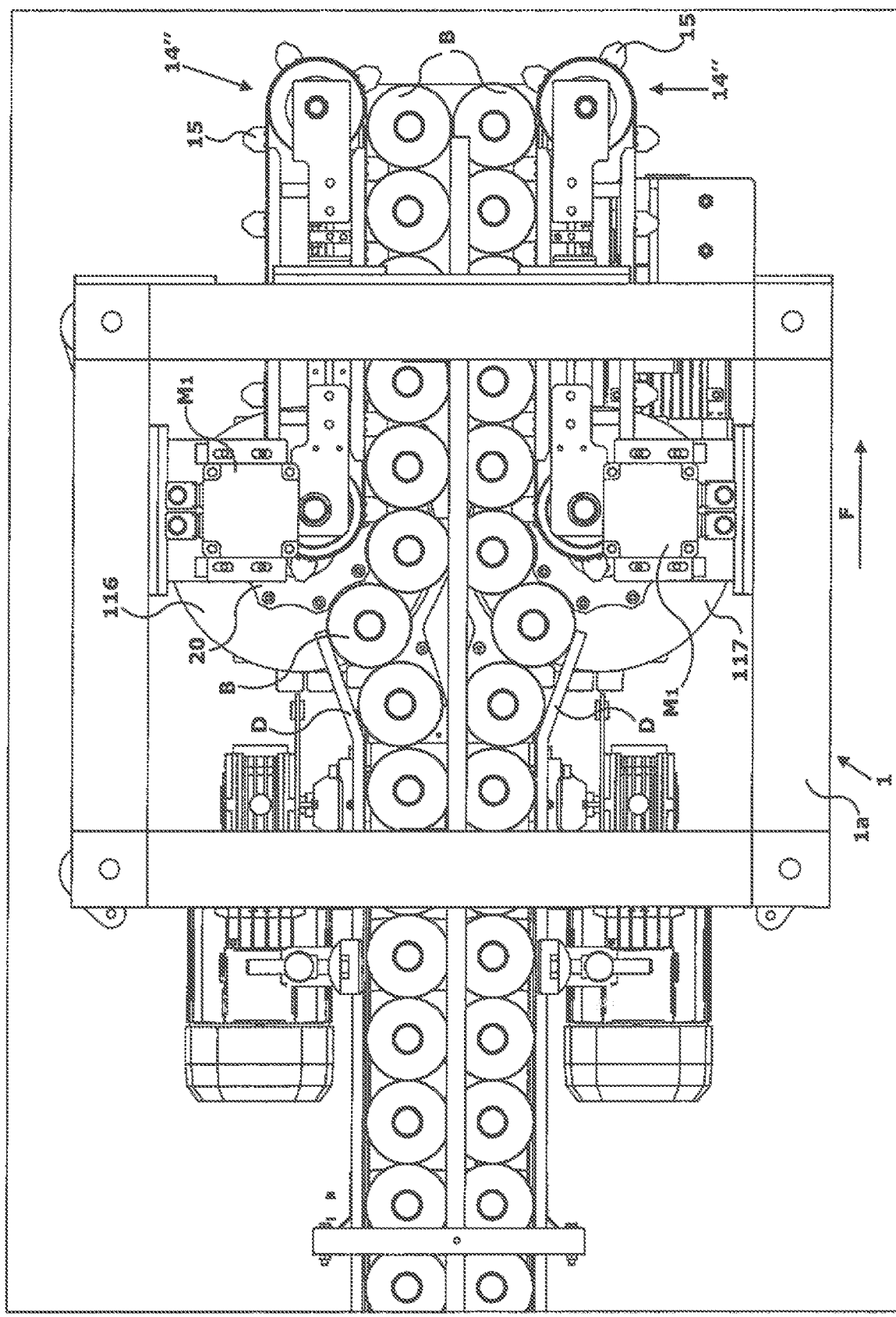
FIG. 9 is a top plan view of a conveying station according to an alternative embodiment.

With reference to FIG. 6B, it can be noticed that belt 14' (as well as belt 14") is closed loopwise around a pair of vertical-axis transmission wheels 16, 17, at least one of which is motorised, being integral in rotation with a toothed gear 16' which meshes with the drive shaft of a drive motor $M_1$.

Transmission wheels 16, 17 have respective support shafts mounted on respective constraint brackets 18a, 19a, in turn adjustedly mounted in position along a common guide 20, so as to be able to adjust the mutual distance between the two transmission wheels 16 and 17 for the purpose of a correct tensioning of belt 14'.

Along the outer surface of belt 14' there are fastened, at preset regular intervals, vertical ribbings 15, preferably shaped with a planar-surface tooth profile. The ribbings are preferable of low-rigidity material, such as rubber, in order to have a good surface grip on the bottles with which they are meant to come into contact. The mutual distance, or pitch, between the ribbings, determines the positioning and the mutual clamping of the bottles in the way better described in the following.

Advantageously, according to a preferred embodiment, all the components of the two intermediate gripping and dragging devices 14' and 14", make up, together with the respective brackets 18a and 19a, a unit removably mounted on the apparatus frame. Thereby, the entire unit may be easily replaced with a similar one having a conveyor belt with a different pitch and height of ribbings 15. It is thereby simple adapting the machine to the different formats of bottles to be wrapped. In the entering step to the upstream wrapping unit 2, the dragging and pacing of bottles B is ensured by intermediate gripping and dragging device 14, with accuracy, due to the fact that ribbings 15 engage between one bottle and the next.

In this step, the distance between ribbings 15 determines the correct mutual positioning of the bottles, with the desired mutual clamping force, so as to form two perfectly aligned rows, which are thus constrained up to the wrapping area where the stretching plastic film is wrapped. The paced and regular dragging action of the intermediate gripping and dragging device 14, in the proximity of the wrapping station, is aided and balanced also by conveyor belt 2 which, pushing the bottles by friction from below, contributes to the balance of the forces which guarantee an alignment of the two rows and the correct attitude of the bottles.

In other words, the bottles thus move in a compact way, that is, mutually adhering on two adjacent rows, with a preset clamping force, and that until full winding with the web of stretching plastic material and until the separation of the array of bottles into assemblies—for example each one of six bottles—to form so-called "bundles" ready for transport to distribution.

Figure 10:
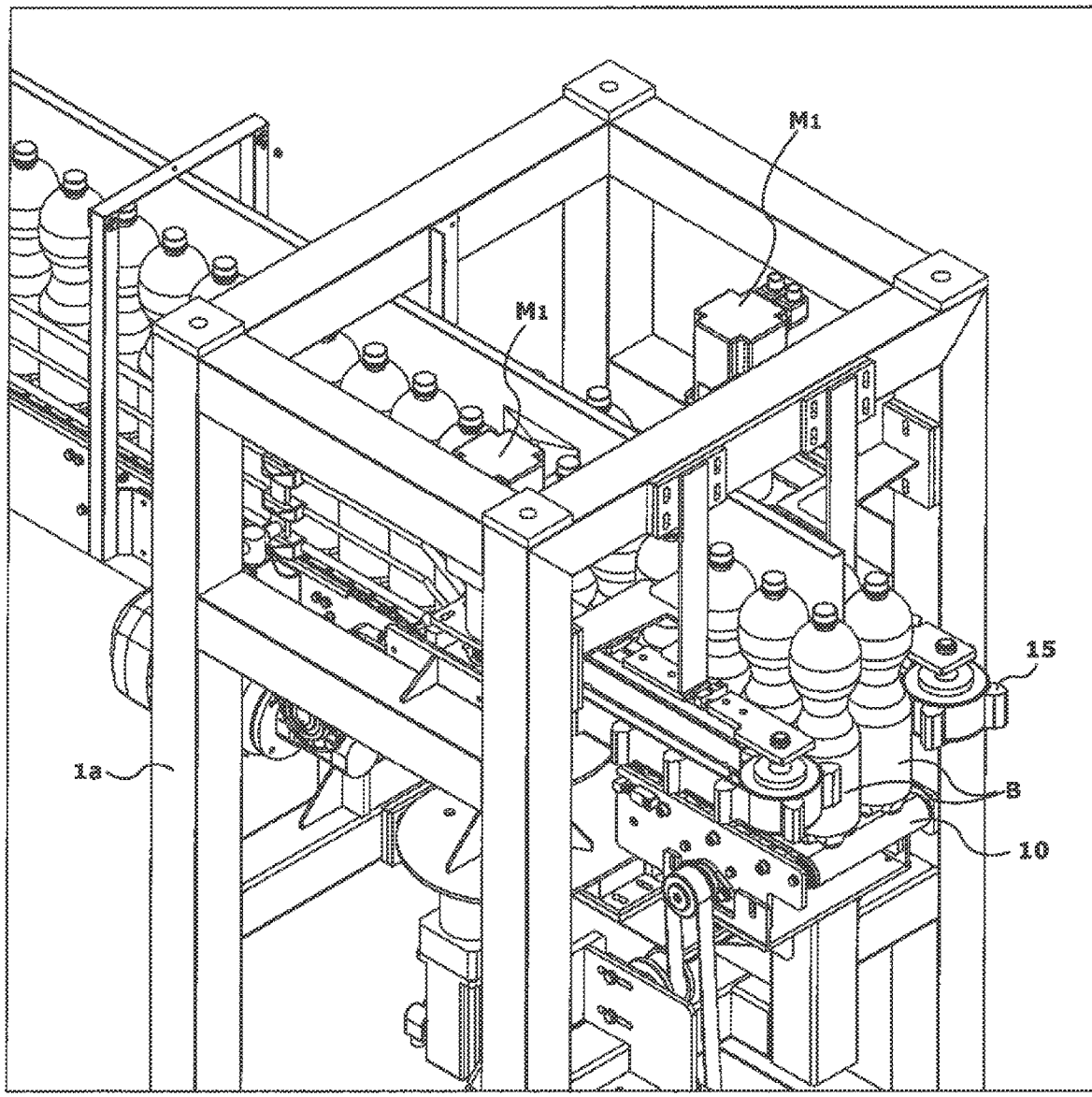
FIG. 10 is a perspective view of the station of FIG. 9.

FIG. 10 shows the terminal part of a feeding line of the bottles according to another embodiment of the invention.

The conveying and pacing adjustment means in this case consist of a pair of suitably arranged dragging devices which adjust in a perfectly calibrated way the mutual positioning of the bottles and the mutual compacting pressure thereof.

Figure 11:
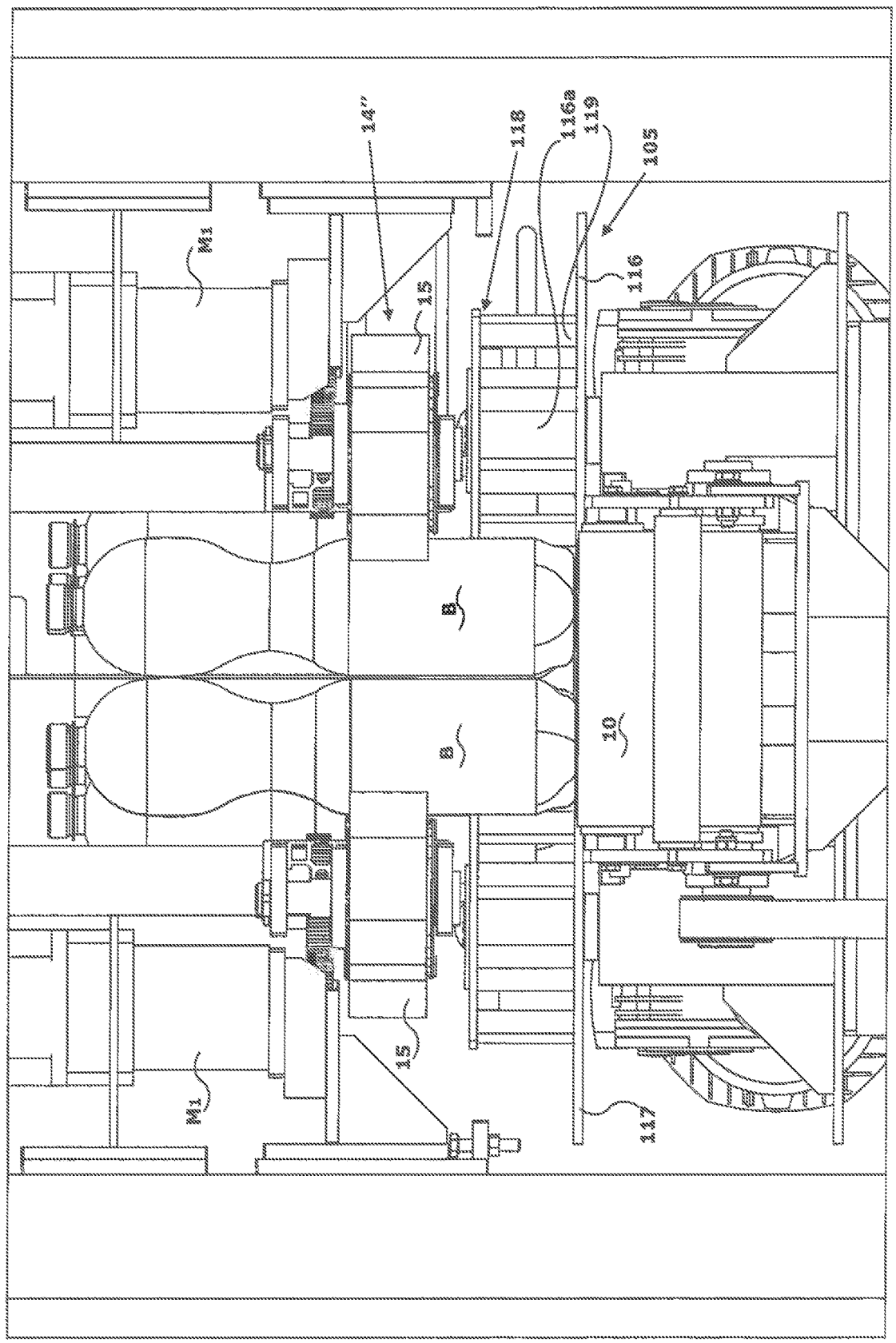
FIG. 11 is an elevation front view similar to that of FIG. 6A, however, referred to the embodiment of FIG. 9.

More precisely, with reference to FIGS. 10-12, in this case the compacting means essentially consist of two distinct gripping and dragging devices, an intermediate one 14 and the other a lower one 105, better described with reference to drawings 4 and 5, respectively, which cooperate with underlying conveyor belt 10 as a complement to bottle displacement.

More precisely, intermediate device 14 is identical to the one described further above.

Lower gripping and dragging device 105 essentially consists of a pair of rotating plates 116, 117, mounted on the same frame and arranged at the two opposite sides of the bottle displacement line.

The upper surface of plates 116 and 117 is arranged flush with the plane of conveyor belt 10, and have mutually parallel vertical rotation axes, X-X and X1-X1, respectively.

These rotating plates 116 and 117 represent a resting plane for the base of bottles B, for guiding them on a controlled path, as detailed here in the following.

The two plates 116 and 117 have identical structure, therefore in the following only one of the two will be described, it being understood that the other has the same composition and configuration.

Plate 116 is integral in rotation with a central motorised shaft 116a and carries, centrally, an upwardly projecting turret 118, making up a centring and paced dragging means of the bottles.

Turret 118 consists of a plurality of pins or columns 119, vertically arranged between the surface of the respective support plate 116 and the opposite surface of a counterplate 120, itself integral in rotation with the motorised central shaft. Said columns 119 are distributed on a circumference centred on the rotation axis X-X of plate 116 and are mutually angularly equidistant. Depending on the size (substantially the diameter) of the bottles, the dimension of the lying circumference of columns 119 is determined: in the illustrated example, eight columns 119 equidistant on a lying circumference with diameter 140 mm are provided.

Counterplate 120, as shown, has a perimeter inscribed in a circumference of a diameter slightly larger than the lying circumference of columns 119. In particular, counterplate 120 has a wavy circumferential profile, provided with a plurality of saddle-like recesses 120*a* between the pairs of adjacent columns 119. The saddle-like recesses 120*a* are meant to accommodate a lateral portion of the bottles, in particular in the lower part thereof, as better described in the following.

Figure 12:
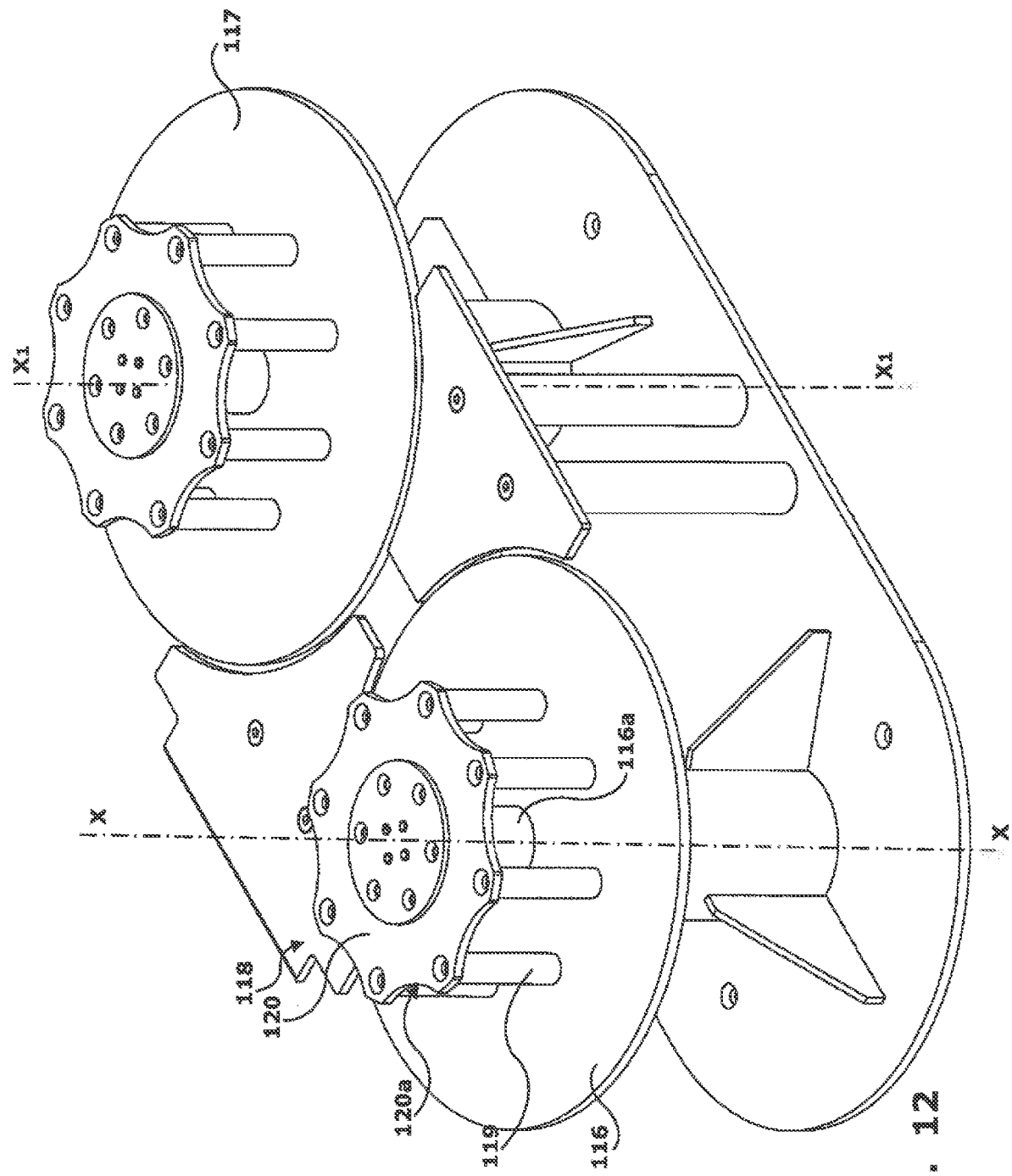
FIG. 12 is a detailed perspective view of the lower dragging device according to the embodiment of FIG. 9.

As can be clearly seen in the drawing of FIG. 12, lower dragging device 105, and hence turret 118, is located—with respect to the bottles B which progress on belt 10—in correspondence of the lower part of the bottles, with plate 116 upwardly flush with conveyor belt 10; vice versa, intermediate dragging device 14, and hence dragging belts 14' and 14", lies immediately above, so as to grip a substantially central area of the bottles. It can be noticed, instead, that lower dragging device 105 is located, in the progress direction of the bottles, immediately upstream of intermediate device 14. In particular, the bottles are initially engaged by lower device 105 which—with a rigid rotation—takes them and arranges them at the correct progress pace, determined by the rotation speed of turret 118, in order to then deliver them to upper dragging device 14 for the subsequent regular and aligned progress towards the wrapping station.

As a matter of fact, bottles B progress in the direction indicated by arrow F, are firstly gasped at the base, since they engage in sequence with the recesses 120*a* between two columns 119 of turret 118. The progress of the bottles in the compacting station is therefore ensured, in an initial phase, by the dragging performed by lower device 105. Through a rigid rotation, lower dragging device 105 is capable of unloading any thrust pressure by which the bottles arrive along the feeding line. The divergent portion D of the lateral containment guides may also contribute to this function, which portion is arranged immediately upstream of turrets 118 and which defines a guide so that the bottles arrive in an optimal position at recesses 120*a*.

Downstream of calibrated conveying station 1 the two units 2, 3 for the winding of the plastic film are provided in sequence. At the entry of such units 2, 3, the bottles rest on a cantilevered slide shelf, around which the coils of plastic film meant for the wrapping of the bottles are necessarily laid, as clearly illustrated in the Italian application mentioned above.

Therefore, according to a preferred embodiment of the invention, it has been detected that it is important, in order to help the regular flow of the double row of bottles up to the cutting and bundle-releasing station, to provide a dragging unit immediately downstream of each of the two wrapping units 2 and 3.

As schematically visible in the drawings, the dragging unit consists of at least a top withdrawal belt T1, T2 and T3, arranged immediately downstream of wrapping units 2 and 3, in the upper part: top withdrawal belt T1, T2 and T3 hence rests on the upper surface of the double row of bottles, by now wrapped with plastic film, imparting by friction a certain traction in the progress direction of the bottles: the regular dragging action, aligned with the progress axis of the transport line, provides an aid to the extraction of the wrapping material from the slide shelf provided in the wrapping unit, thereby contributing to maintaining a balance of the forces imparted on the bundle which hence tends not to disassemble.

As visible in FIG. 1, the two wrapping units are mutually distanced precisely by the amount necessary for installing between them a withdrawal belt T1 and an underlying portion of conveyor belt.

Although a withdrawal belt may also be arranged differently, the positioning thereof in the top part of the bottles implies significant advantages. Firstly, being on the displacement axis, it may be individual without creating imbalances in the traction forces. Moreover, acting on the top part of the bottles, where the neck and the cap is provided, it causes no yielding of bottles B, because the forces act on the longitudinal axis where bottle rigidity is greatest.

Downstream of the last dragging unit T2, the continuous train of bottles B wound with a double spiral of stretching film, makes up a well-consolidated single body.

Figure 13:
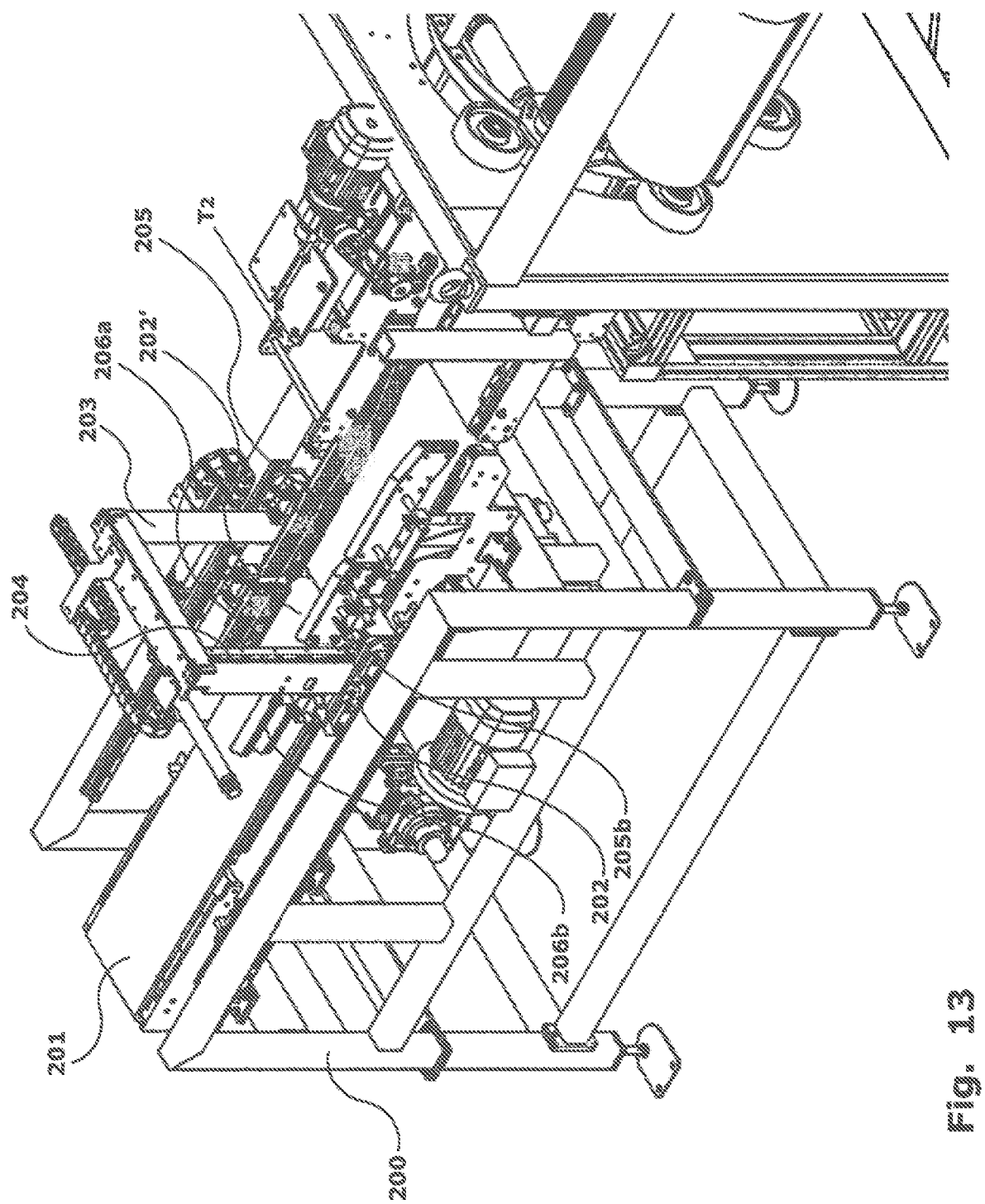
FIG. 13 is a perspective view of a cutting and spacing-apart station according to a preferred embodiment of the invention.
Figure 14C:
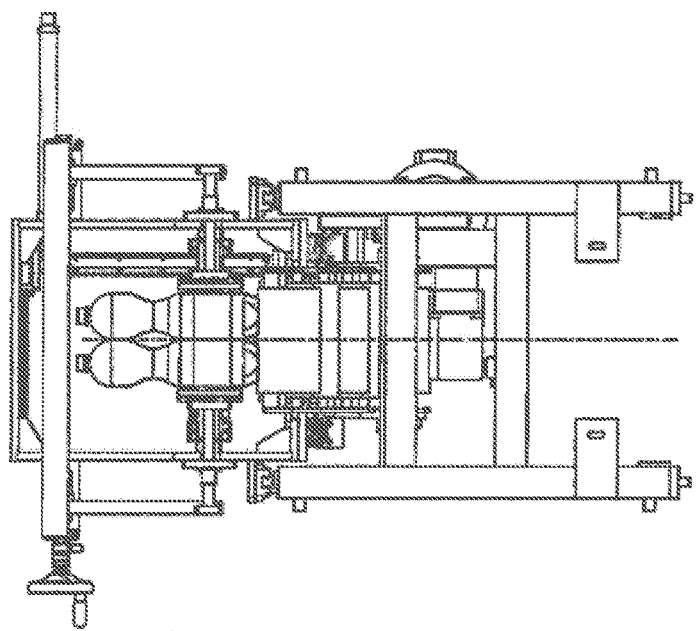
FIG. 14C is an elevation front view of the station of FIG. 14A.
Figure 14A:
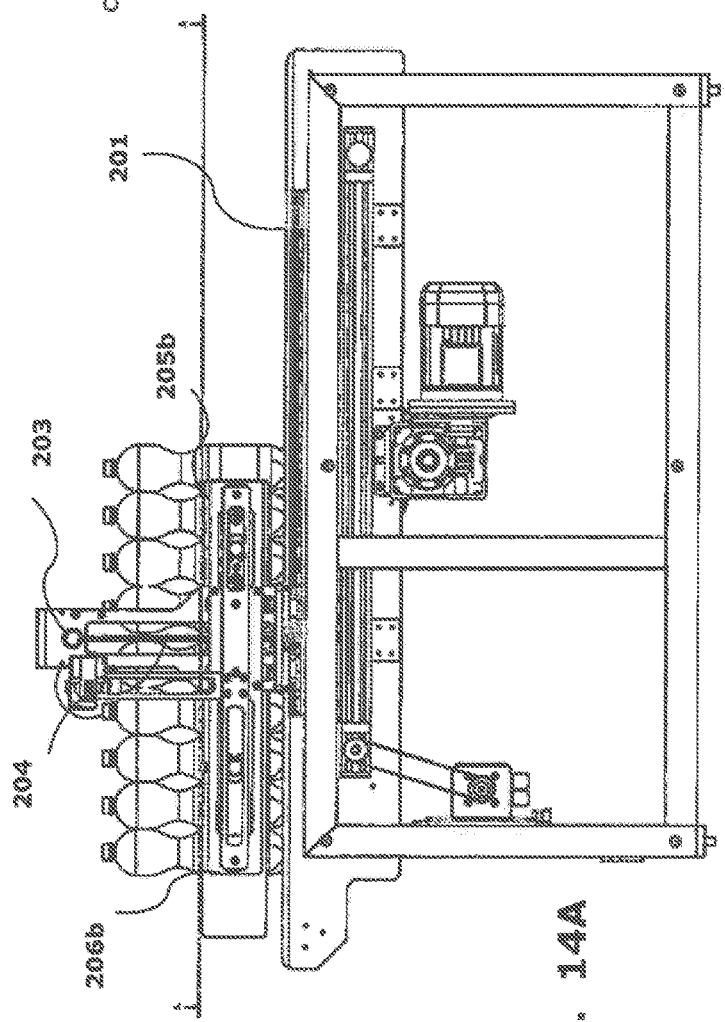
FIG. 14A is a side elevation view of the station of FIG. 13 in a travel end condition of the cutting blade.
Figure 14B:
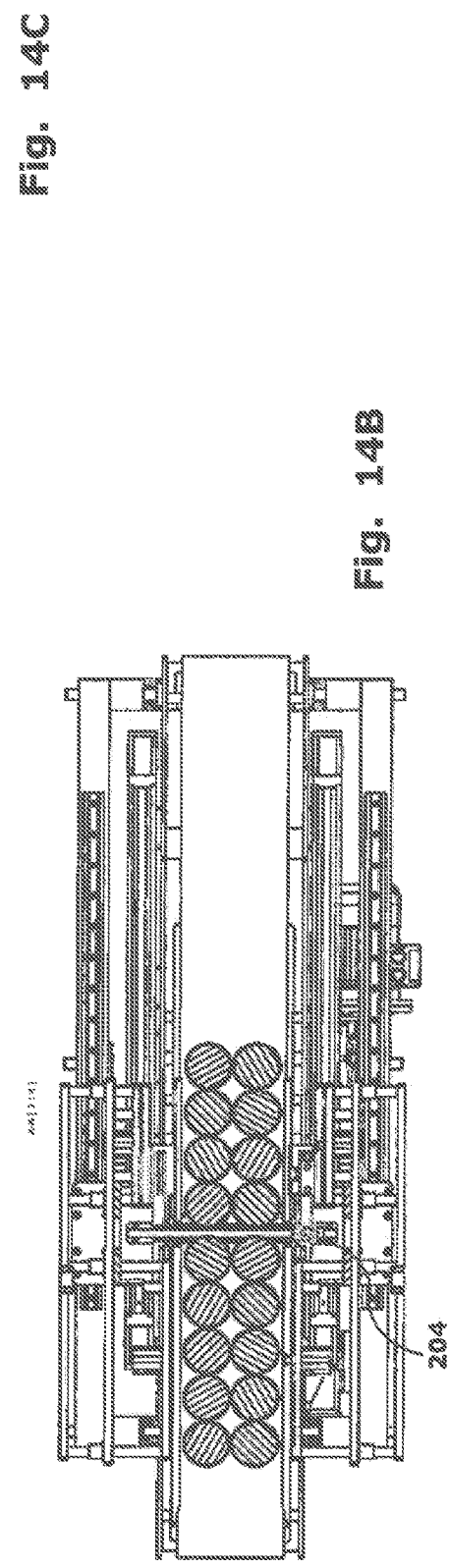
FIG. 14B is a top plan view, partly in section, of the station of FIG. 14A.
Figure 15C:
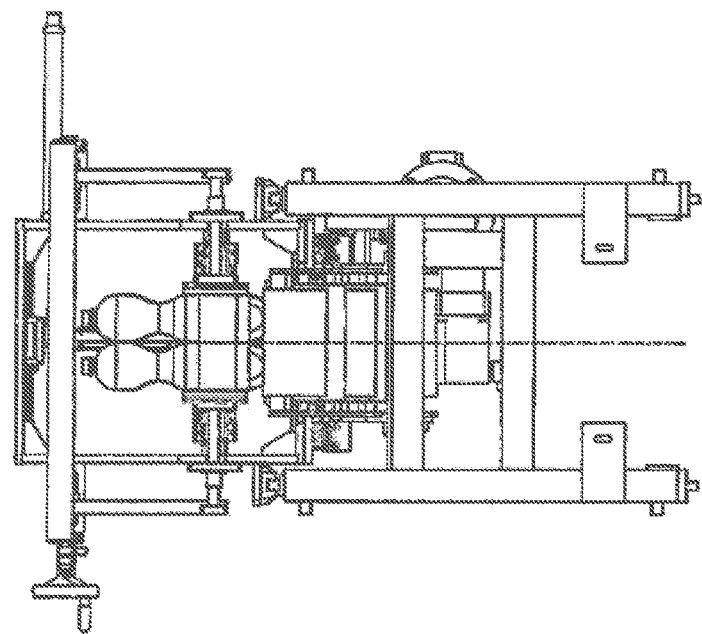
FIG. 15C is an elevation front view of the station of FIG. 15A.
Figure 15A:
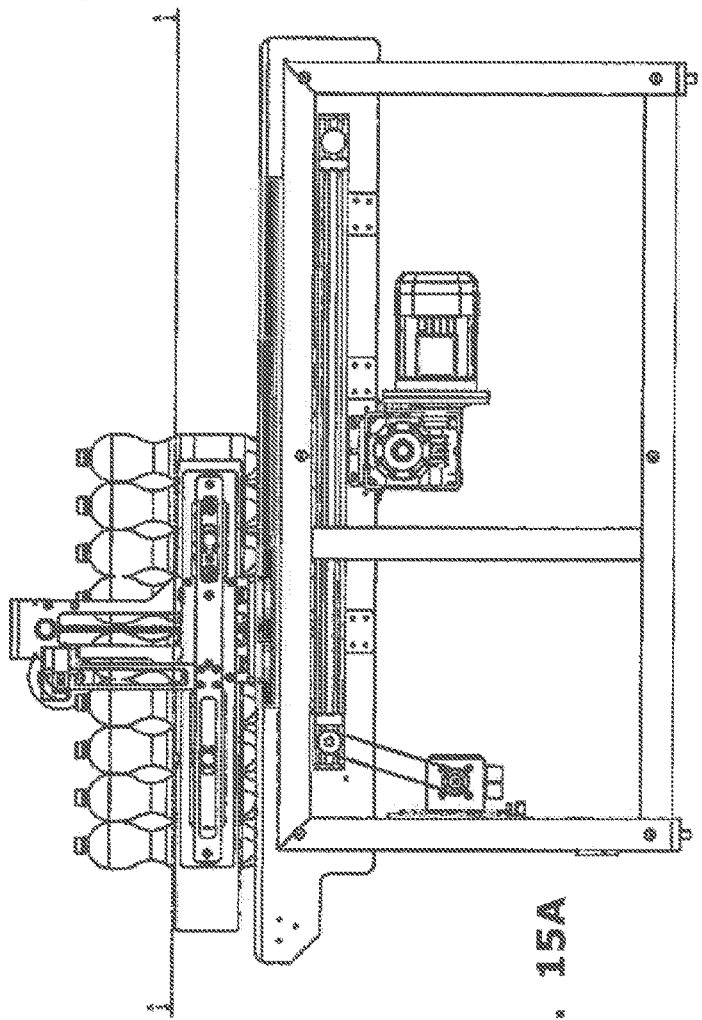
FIG. 15A is a similar view to FIG. 14A, in an operating condition of the cutting blade.
Figure 15B:
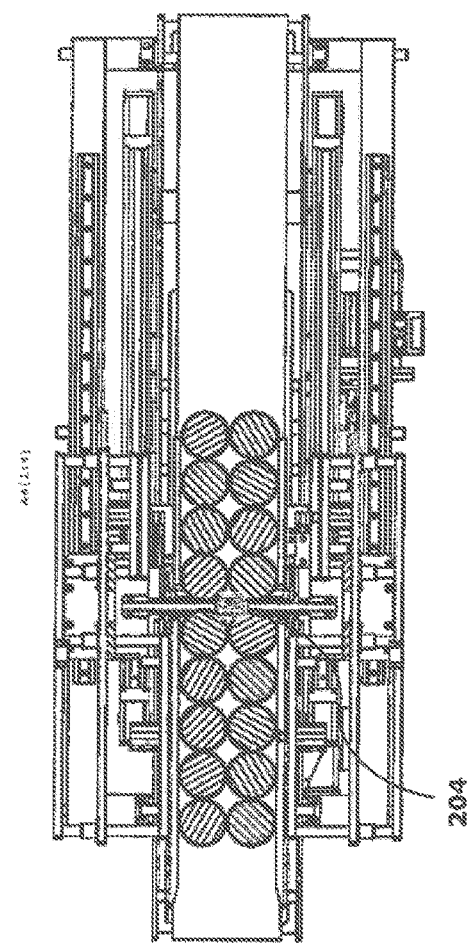
FIG. 15B is a top plan view, partly in section, of the station of FIG. 15A.

In this location a cutting and spacing-apart unit 4 is provided which also separates the individual bundles, clearly described in the following with reference to FIGS. 13-15.

Cutting and spacing-apart unit 4 also consists of a frame 200 which supports a conveyor belt 201 apt to support and lead the wrapped bottles coming out of the downstream wrapping unit 3.

Conveyor belt 201 is closed loopwise around two terminal cylinders (not visible in the drawings) and around a triplet of intermediate cylinders (also not visible) mounted on a carriage 202 translatable in a longitudinal direction, forming a typical short interruption 202' in the continuity of the upper surface of the conveyor belt.

Translatable carriage 202 is controlled according to an alternate movement, backwards and forwards: in its progress movement (that is, in the bottle progress direction) it is synchronised with conveyor belt 201, so that the two progress speeds are substantially identical; in the backward movement of carriage 202 the speed is determined in order to reduce idle times and to keep the work area limited, compatibly with the accelerations which the carriage can withstand.

On carriage 202 there is mounted, integral in motion, a bridge frame 203 which is arranged crosswise across the displacement line defined by conveyor belt 201. On bridge 203 there is installed a hot-blade device 204, apt to transfer crosswise to the conveyor belt, from one part to the other (see comparison of FIGS. 14B and 15B), a thin hot blade (of the type commonly known per se) arranged with a vertical attitude. Preferably, the hot blade device has two hot blades, arranged on the opposite edges of a vertical bar: thereby, the device may be effective—for hot cutting the plastic film—in both run directions, that is, proceeding from the left to the right of the conveyor belt, but also in the opposite direction. On bridge 203 there is furthermore provided a bottle counting sensor (optic sensor, mechanic encoder, or other), which is capable of detecting the passage of specific bottle parts (typically the upper cap), determining the number of bottles passed to then control the movement of carriage 202 accordingly. A control unit of carriage 202 furthermore provides to control the backward and forward movement of the carriage, as well as the crosswise movement of hot blade device 204, so as to suitably severe bottle assemblies (the so-called bundles) from the single body of wrapped bottles coming out from wrapping units 2 and 3.

The separation of the bottle groups occurs through the action of the hot blade device 204 which cuts the plastic film, inserting itself crosswise between two adjacent bottle lines, that is between one pair of bottles and the preceding (or following) pair. For such purpose, carriage 202—once the counting sensor has detected the passage of the desired number of bottles—is driven into synchronised movement with conveyor belt 201, so that the hot blade may act on the wrapping material at a null relative displacement speed with respect to the bottles.

Since the bottles are tightened one against the other by the elastic action of the stretching film, in order to favour the action of the hot blade (preventing blade heat from interfering with the plastic material of the bottles), according to a preferred embodiment of the invention, an elongation mechanism is furthermore provided.

The elongation mechanism comprises at least a first pair of retaining plates 205*a*, 205*b* and a second pair of retaining plates 206*a*, 206*b*, upstream and downstream, respectively, of hot blade device 204. These pairs of retaining plates are mounted on the same carriage 202 on which the hot blade also translates; however, at least one of the pair of retaining plates is longitudinally movable with respect to the other: the opportunity in substance exists of moving mutually apart, by a short distance (in the order of 0.5-2 cm), the two pairs of retaining plates.

The retaining plates are configured for engaging each a pair of adjacent bottles and, hence, the pairs of bottles belonging to two adjacent lines. The engagement may be accomplished simply by pressure (that is, the two opposite plates 205*a* and 205*b* or 206*a* and 206*b*, move closer to each other clamping the bottles in the middle, with a certain pressure) or with suitable mechanic protrusions (for example folded parts of the plate metal sheet, or crosswise projecting flaps, or other) or again by other systems. The first pair of retaining plates hence retains a pair of side-by-side bottles, while the second pair of retaining plates retains the immediately adjacent pair of side-by-side bottles (that is, the bottles of the adjacent line): thereby, causing then the mutual moving apart of the pairs of plates, a slight spacing-apart of the two pairs of adjacent bottles is also determined—temporarily overcoming the elastic resistance of the film wrapping—by so much as to allow an easy introduction of the hot blade (which, standing vertically, runs crosswise to the row of bottles and cuts the wrapping film). Said hot blade runs in the area between the two pairs of bottles maintained spaced-apart by the pairs of moved-apart retaining plates, so as to find a space sufficient not to interfere with the surface of the bottles.

The operation of the cutting and spacing-apart unit 4 occurs in this way.

Bridge 203 is initially still in a backward (home) position (home). Through the counting sensor the passage of the desired number of bottles is detected (for example three bottles for standard bundles) and hence the movement of carriage 202 is controlled, so that bridge 203 perfectly follows the motion of conveyor belt 201, cancelling relative speed. When the speed of bridge 203 is synchronised with the progress speed of the bottle array, the elongation mechanism is controlled, so as to temporarily space apart the two pairs of adjacent bottles and to introduce therebetween the hot blade through the crosswise movement of cutting device 204. In its crossing, from right to left or vice versa, the hot blade cuts across the plastic film wound on the bottles, severing a bundle, with the desired number of bottles (downstream of the hot blade), from the remaining continuous body of wrapped bottles (upstream of the hot blade).

Once the cutting is completed, carriage 202, with relative bridge 203, cutting device 204 and retaining plates 205-206*b*—which in the meantime have progressed up to a forward travel-end position—quickly returns backward to the starting (home) position with an idle travel. Hot blade device 204, if it is shaped as in the preferred embodiment illustrated above, remains on the side in which it has completed the cut—so as not to delay the carriage return times—and it will move in the opposite direction in the subsequent cutting cycle.

As can be guessed from the above, the apparatus according to the invention perfectly achieves the objects set forth in the preliminary remarks.

In particular, through a configuration which simultaneously has a conveyor belt cooperating with an improved guiding assembly, it guarantees a perfect alignment of the two rows of bottles, in all the processing steps up to the cutting and severing of the bundle, also discharging any overpressures coming from the feeding line. The presence of a downstream dragging device further improves the advantageous effect of balancing the driving forces on the bottles until the cutting station of the plastic film and the relative severing of the bundle.

The cutting unit is extremely effective and allows to produce bundles of any size—suitably programming the action of the hot blade based on the detection of the counting sensor—with no risk for bottle integrity.

However, it is understood that the invention must not be considered limited to the special arrangement illustrated above, which represents only an exemplifying embodiment thereof, but that a number of variants are possible, all within the reach of a person skilled in the field, without departing from the scope of the invention, as defined by the following claims.

For example, the movement of turrets 18, conveyor belt 2 and side belts 10, 11 may be synchronized either by simply assembling with suitable electric axes the respective driving motors, or by providing mechanic devices for mutual coupling.

Moreover, although not specifically described, the height and the lateral position of intermediate dragging device 14, such as that of the guiding rods and of the upper rail, may be adjusted at will, by systems known per se. A height and lateral position adjustment of these elements allows to always arrange the thrusting action on the bottles as close as possible to the centre of gravity thereof, adapting the apparatus to the formats of the bottles to be wrapped.

Finally, it must be considered that the apparatus of the invention may be employed for the wrapping also of other objects (for example other types of containers, such as glass bottles, tins, boxes, . . . ) which are presented in parallel arrays (even more than two rows) and must be wrapped in groups.

The invention claimed is:

1. A wrapping apparatus for containers in bundles as rows of adjacent containers, comprising:
   a wrapping station (2, 3) wherein a film of stretching plastic material is continuously spirally wound on adjacent rows of containers moving according to a displacement axis, said film being delivered by reels rotating around said displacement axis;
   downstream of said wrapping station (2, 3), a cutting and severing unit is provided with at least a bridge carriage (202, 203), alternately movable according to a translation axis parallel to the displacement direction of said containers, whereon a cutting device (104) is mounted, movable crosswise to said translation axis; and
   an elongation mechanism, equipped with a first pair of retaining members (205*a*, 205*b*) and a second pair of retaining members (206*a*, 206*b*) mounted on said bridge carriage (202, 203), upstream and downstream, respectively, of said cutting device (204), mutually movable apart and each configured to engage with a line of said containers in order to space them apart from each other and to define a greater crossing gap for said cutting device (104).

\* \* \* \* \*